US008503206B2

(12) United States Patent
Ohshima et al.

(10) Patent No.: US 8,503,206 B2
(45) Date of Patent: Aug. 6, 2013

(54) SINGLE-PHASE VOLTAGE SOURCE DC-AC POWER CONVERTER AND THREE-PHASE VOLTAGE SOURCE DC-AC POWER CONVERTER

(75) Inventors: Masaaki Ohshima, Tokyo (JP); Shuichi Ushiki, Tokyo (JP); Jinbin Zhao, Tokyo (JP); Hirokazu Shimizu, Tokyo (JP)

(73) Assignee: Origin Electric Company, Limited, Toshima-ku, Tokyo (JP)

( * ) Notice: Subject to any disclaimer, the term of this patent is extended or adjusted under 35 U.S.C. 154(b) by 595 days.

(21) Appl. No.: 12/695,836

(22) Filed: Jan. 28, 2010

(65) Prior Publication Data
US 2010/0302825 A1 Dec. 2, 2010

(51) Int. Cl.
H02M 7/5387 (2007.01)

(52) U.S. Cl.
USPC ............................................. 363/98; 363/40

(58) Field of Classification Search
USPC ...................... 363/40–42, 95, 97–98, 131–132
See application file for complete search history.

(56) References Cited

U.S. PATENT DOCUMENTS

| | | | | |
|---|---|---|---|---|
| 4,757,434 | A * | 7/1988 | Kawabata et al. | 363/41 |
| 4,823,251 | A * | 4/1989 | Kawabata et al. | 363/95 |
| 6,310,787 | B2 * | 10/2001 | Ito et al. | 363/34 |
| 7,177,165 | B2 * | 2/2007 | Deng et al. | 363/40 |
| 7,184,282 | B2 | 2/2007 | Ohshima et al. | 363/40 |
| 7,495,936 | B2 | 2/2009 | Ohshima et al. | 363/36 |
| 2006/0245221 | A1 * | 11/2006 | Ohshima et al. | 363/131 |
| 2006/0256586 | A1 * | 11/2006 | Ohshima et al. | 363/16 |

FOREIGN PATENT DOCUMENTS

| | | |
|---|---|---|
| JP | 2006254636 A | 9/2006 |
| JP | 2006340549 A | 12/2006 |
| JP | 2007236083 A | 9/2007 |

OTHER PUBLICATIONS

Masaaki Ohshima, et al., "A Novel Single-Phase UPS Inverter by Error-Tracking Mode PWM Scheme", Journal of IEEJ D, vol. 120, Jan. 2000, pp. 104-111 (w/ English abstract).
Masaaki Ohshima, et al., "A Novel Three-Phase UPS Inverter Driven by Error-Tracking-Mode PWM Scheme", Journal of IEEJ D, vol. 125, No. 2 (2005), pp. 164-173 (w/ English abstract).

* cited by examiner

*Primary Examiner* — Harry Behm
(74) *Attorney, Agent, or Firm* — Ohlandt, Greeley, Ruggiero & Perle, L.L.P.

(57) ABSTRACT

The present invention is a single-phase voltage source DC-AC power converter and a three-phase voltage source DC-AC power converter. Each of the single-phase voltage source DC-AC power converter and the three-phase voltage source DC-AC power converter includes a voltage source DC-AC power converting circuit that converts power from a DC voltage source into AC power to output the AC power from an AC terminal; and target current producing means that includes a filter voltage command device and a voltage controller, the filter voltage command device generating a filter voltage command value that becomes a reference of the AC power output from the AC terminal, the AC output voltage at the AC terminal being input as an input signal to the voltage controller, the voltage controller integrating a difference between the filter voltage command value from the filter voltage command device and the AC output voltage at the AC terminal, the target current producing means outputting a PWM command such that a DC component included in the AC output voltage at the AC terminal becomes zero.

6 Claims, 16 Drawing Sheets

SINGLE-PHASE VOLTAGE SOURCE DC-AC POWER CONVERTER AND THREE-PHASE VOLTAGE SOURCE DC-AC POWER CONVERTER

FIELD

The present invention relates to a single-phase power converter and a three-phase power converter. Particularly the invention relates to the single-phase power converter and three-phase power converter in which, in a power converter that converts DC power to AC power, a target current is corrected by integrating an error signal between a voltage command value or a voltage command vector and an output voltage, thereby suppressing a DC component included in the AC power.

BACKGROUND

An error-tracking PWM method is well known as a method for controlling AC output voltage of a voltage source DC-AC power converter used in an Uninterruptible Power System (UPS) and the like (for example, see Masaaki Ohshima, et al., "A Novel Single-Phase UPS Inverter by Error-Tracking Mode PWM Scheme", Journal of IEEJ D, vol. 120, Jan., 2000, pages 104 to 111, and Masaaki Ohshima, et al., "A Novel Three-Phase UPS Inverter Driven by Error-Tracking-Mode PWM Scheme", Journal of IEEJ D, vol. 125, No. 2 (2005), pages 164 to 173).

Frequently the voltage source DC-AC power converter includes a transformer in order to insulate a converter and a load or to match output of the converter to system voltage at the load. On the other hand, when a DC component is included in input voltage of a load-side transformer due to a temperature drift or a deviation of an offset of a converter control system, an iron core of the transformer is unidirectionally magnetized by the DC component to generate biased magnetization in which a magnetic flux distribution is biased. This causes problems such as an extreme decrease in excitation inductance of the transformer, a passage of an excessive excitation current, a distortion of AC output voltage, local heating of the transformer, and an increase in electromagnetic noise. Therefore, the AC power supplied from the voltage source DC-AC power converter becomes unstable. For example, a technique of correcting a PWM command using DC component suppressing means for integrating AC output voltage as illustrated in FIGS. 15 and 16 is well known as the method for solving the problems (for example, see Japanese Patent Publication Laid-Open No. 2006-254636). FIG. 15 illustrates a single-phase power converter 211 that produces single-phase AC power from a DC power supply to supply the single-phase AC power to a load connected to an output terminal 222. The single-phase power converter 211 includes a single-phase voltage source DC-AC power converting circuit 240, an inductor Lsp, a voltage detecting circuit 250, and a target current producing means 260. The single-phase voltage source DC-AC power converting circuit 240 converts DC power from a DC terminal 221 to the single-phase AC power. The inductor Lsp is connected to an AC side of the single-phase voltage source DC-AC power converting circuit 240. The voltage detecting circuit 250 detects an output terminal-to-output terminal voltage applied between the output terminals 222. The target current producing means 260 produces target current as a target value of output current at the AC terminal 222. Pulse width modulation control of the single-phase voltage source DC-AC power converting circuit 240 of the converter is performed based on an error between the inverter current and the target current. The target current producing means 260 includes an integrator 271 that amplifies an integration value of the voltage between the output terminals 222, detected by the voltage detecting circuit 250, and a DC component suppressing means 282 that corrects the target current to suppress the DC component included in the single-phase AC power. FIG. 16 illustrates a three-phase power converter 312 that produces three-phase AC power from the DC power supply to supply the three-phase AC power to a load connected to an output terminal 322. The three-phase power converter 312 includes a three-phase voltage source DC-AC power converting circuit 340, an inductor Lsp, a voltage detecting circuit 350, and a target current producing means 360. The three-phase voltage source DC-AC power converting circuit 340 converts DC power from a DC terminal 321 to the three-phase AC power. The inductor Lsp is connected to an AC side of the three-phase voltage source DC-AC power converting circuit 340. The voltage detecting circuit 350 detects an output terminal-to-output terminal voltage applied between the output terminals 322. The target current producing means 360 produces target current as a target value of output current. The pulse width modulation control of the converter is performed based on an error between the inverter current and the target current. The target current producing means 360 includes an integrator 371 that amplifies an integration value of output terminal-to-output terminal voltage detected by the voltage detecting circuit 350 and a correction amount computing means 382 that corrects the target current to suppress the DC component included in the three-phase AC power.

SUMMARY OF INVENTION

Occasionally the DC component caused by external factors such as a biased sensor and a temperature drift of an input operational amplifier is included in the PWM command (target current) of the voltage source DC-AC power converting circuit, thereby superimposing the DC component on the AC output voltage of the voltage source DC-AC power converter. In the conventional voltage source DC-AC power converter, when the external factors are removed, internal equivalent impedance of the DC-AC power converting circuit cannot be specified.

In view of the foregoing, an object of the invention is to provide a single-phase voltage source DC-AC power converter and a three-phase voltage source DC-AC power converter, in which the internal equivalent impedance can be specified while the superimposition of the DC component included in the PWM command on the AC output voltage can more correctly be suppressed.

In order to achieve the object, in the invention, the PWM command is corrected by integrating an error voltage between an output voltage and a filter voltage command that is a reference of the single-phase AC power.

Specifically, in accordance with a first aspect of the invention, a single-phase voltage source DC-AC power converter includes: a single-phase voltage source DC-AC power converting circuit that converts power from a DC voltage source into single-phase AC power according to pulse width of a gate signals that are generated based on a PWM scheme, and outputs the single-phase AC power from an AC terminal; and target current producing means that includes a filter voltage command device and a voltage controller, the filter voltage command device generating a filter voltage command value that becomes a reference of the single-phase AC power output from the AC terminal, the single-phase AC output voltage at the AC terminal being input as an input signal to the voltage controller, the voltage controller integrating a difference between the filter voltage command value from the filter voltage command device and the single-phase AC output voltage at the AC terminal, the target current producing means outputting the PWM command such that a DC component included in the single-phase AC output voltage at the AC terminal becomes zero.

In the single-phase voltage source DC-AC power converter according to the first aspect of the invention, a voltage controller of the target current producing means includes an integrator and an amplifier. The integrator integrates the difference between the filter voltage command value and the single-phase AC output voltage of the AC terminal. The integration value of the integrator is a DC reverse-sign component included in the single-phase AC output voltage. Therefore, the target current producing means adds the output of the integrator to the output of the amplifier and outputs the PWM command such that the DC component becomes zero, which allows the target current producing means to suppress the superimposition of the DC component on the AC output voltage.

Accordingly, the present invention can provide the single-phase voltage source DC-AC power converter that can more correctly suppress the superimposition of the DC component included in the PWM command on the AC output voltage. Additionally, the integrator is provided in parallel with the amplifier of the target current producing means, so that the internal equivalent impedance of the DC-AC power converting circuit can be specified.

The single-phase voltage source DC-AC power converter according to the first aspect of the invention further includes an output current detecting circuit that detects the single-phase AC output current at the AC terminal to input the detected current value as an input signal to the target current producing means. In the single-phase voltage source DC-AC power converter, the target current producing means further includes: a filter current compensator that adds a current compensation value to the PWM command output from the voltage controller, the current compensation value being defined so as to compensate a current loss in a single-phase AC filter circuit of the single-phase voltage source DC-AC power converting circuit; a PWM current deviation compensator that adds a current deviation compensation value to the PWM command output from the voltage controller, the current deviation compensation value being defined so as to compensate a current deviation of single-phase AC output current from the single-phase voltage source DC-AC power converting circuit; and a feedforward amplifier that amplifies the detected current value input from the output current detecting circuit with a predetermined gain, adds the detected current value to the PWM command output from the voltage controller, and compensates a fluctuation in single-phase AC output voltage caused by a change in single-phase AC output current at the AC terminal.

Because the target current producing means includes the filter current compensator, a current loss can previously be set and added to the PWM command from the target current producing means in the single-phase voltage source DC-AC power converting circuit, and the loss can be compensated. Because the target current producing means includes the PWM current deviation compensator, a current deviation can previously be set and added to the PWM command from the target current producing means in the single-phase voltage source DC-AC power converting circuit when the PWM command is zero command, and the loss can be compensated.

Further, the single-phase voltage source DC-AC power converter includes the output current detecting circuit, and the target current producing means includes the feedforward amplifier. Therefore, a predetermined feedforward gain is set to the feedforward amplifier so as to compensate the current passed through the AC terminal, which allows the single-phase voltage source DC-AC power converter to stably generate the single-phase AC output voltage even if the load current is changed.

In the single-phase voltage source DC-AC power converter according to the first aspect of the invention, preferably the voltage controller includes an amplifier and an integrator, the amplifier and the integrator being connected in parallel, the difference between the filter voltage command value from the filter voltage command device and the single-phase AC output voltage at the AC terminal being input to the amplifier and the integrator, and a transfer function is preferably expressed as $\alpha(1+1/(T_I \cdot S))$, where $\alpha$ is a gain of the amplifier and $T_I$ is an integration time constant of the integrator.

The biased magnetization of the transformer connected onto the AC output terminal side can be resolved by setting a value of the integration time constant $T_I$ of the integrator.

The three-phase voltage source DC-AC power converter can obtain the effect similar to that of the single-phase voltage source DC-AC power converter.

In accordance with a second aspect of the invention, a three-phase voltage source DC-AC power converter includes: a three-phase voltage source DC-AC power converting circuit that converts power from a DC voltage source into three-phase AC power according to pulse width of gate signals that are generated based on a PWM scheme, and outputs the three-phase AC power from an AC terminal; and target current producing means that includes a filter voltage vector command device and a voltage controller, the filter voltage vector command device generating a filter voltage command vector that becomes a reference of the three-phase AC power output from the AC terminal, the three-phase AC output voltage at the AC terminal being input as an input signal to the voltage controller, the voltage controller integrating a difference between the filter voltage command vector from the filter voltage vector command device and the three-phase AC output voltage at the AC terminal, the target current producing means outputting a PWM command such that a DC component included in the three-phase AC output voltages at the AC terminal becomes zero.

The three-phase voltage source DC-AC power converter according to the second aspect of the invention further includes an output current detecting circuit that detects the three-phase AC output currents at the AC terminal to input the detected current value as an input signal to the target current producing means. In the three-phase voltage source DC-AC power converter, the target current producing means includes: a filter current compensator that adds a current compensation vector to the PWM command output from the voltage controller, the current compensation vector being defined so as to compensate a current loss in a three-phase AC filter circuit of the three-phase voltage source DC-AC power converting circuit; a PWM current deviation compensator that adds a current deviation compensation vector to the PWM command output from the voltage controller, the current deviation compensation vector being defined so as to compensate a current deviation of three-phase AC output current from the three-phase voltage source DC-AC power converting circuit; and a feedforward amplifier that amplifies the detected current value input from the output current detecting circuit with a predetermined gain, adds the detected current value to the PWM command output from the voltage controller, and compensates a fluctuation in three-phase AC output voltages caused by a change in three-phase AC output currents at the AC terminal.

Preferably the three-phase voltage source DC-AC power converter according to the second aspect of the invention further includes an M conversion circuit that converts the input signal input to the target current producing means into a signal on an αβ coordinate space having an α-axis and a β-axis, the α-axis and the β-axis being orthogonal to each other based on one of three phases, the M conversion circuit inputting the signal on the αβ coordinate space to the target current producing means.

The M conversion circuit performs the M conversion of the three-phase AC output voltage at the AC terminal into three-phase AC output voltage on the αβ coordinate space, so that the amplitude and frequency of the three-phase AC output power of the three-phase voltage source DC-AC power converter can be detected with respect to the amplitude and frequency of the power system even if the amplitude and frequency of the power system are changed. At this point, it is necessary to perform the M conversion to the current value detected by the output current detecting circuit.

As with the single-phase voltage source DC-AC power converter according to the first aspect of the invention, in the three-phase voltage source DC-AC power converter according to the second aspect of the invention, preferably the voltage controller includes an amplifier and an integrator, the amplifier and the integrator being connected in parallel, the difference between the filter voltage command vector from the filter voltage vector command device and the three-phase AC output voltage at the AC terminal being input to the amplifier and the integrator, and a transfer function is preferably expressed as $\alpha(1+1/(T_I \cdot S))$, where α is a gain of the amplifier and $T_I$ is an integration time constant of the integrator.

The invention can provide the single-phase voltage source DC-AC power converter and the three-phase voltage source DC-AC power converter that can more correctly suppress the superimposition of the DC component included in the PWM command on the AC output voltage. Therefore, the single-phase voltage source DC-AC power converter and three-phase voltage source DC-AC power converter of the invention can suppress the biased magnetization of the transformer connected to the AC terminal.

Further, the internal equivalent impedance is specified in the single-phase voltage source DC-AC power converter and the three-phase voltage source DC-AC power converter of the invention. Therefore, parallel operation can easily be performed, and autonomous parallel operation in which an individual device autonomously controls an output deviation can be performed even if plural devices are connected in parallel to perform the parallel operation.

DETAILED DESCRIPTION

Figure 1:
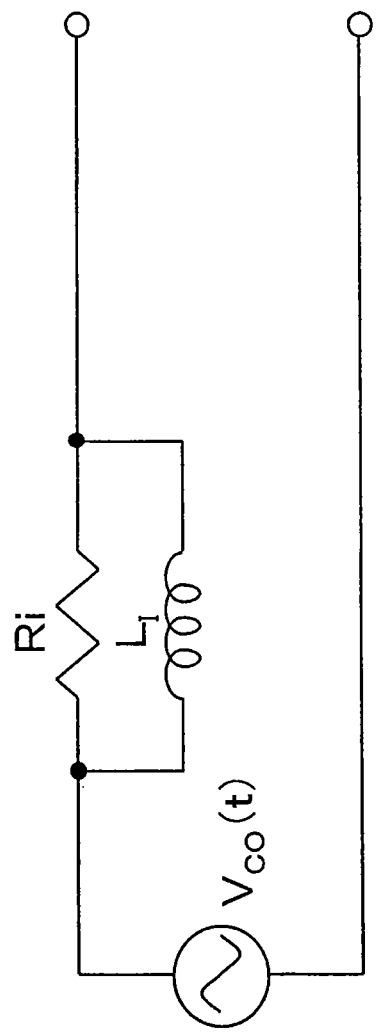
FIG. 1 illustrates an equivalent circuit when a voltage source DC-AC power converter is viewed from an AC terminal thereof.

Hereinbelow, exemplary embodiments of the invention will be described in detail with reference to the drawings. However, the invention is not limited to the following embodiments. In the description and drawings, the same component is designated by the same reference numeral.

The present application is related to Japanese Patent Application No. 2008-039132, filed on Feb. 20, 2008, the disclosure of which is hereby incorporated by reference herein in its entirety.

(Internal Equivalent Impedance of Voltage Source DC-AC Power Converter)

FIG. 1 illustrates an equivalent circuit when a voltage source DC-AC power converter is viewed from an AC terminal thereof. In FIG. 1, the letter $V_{CO}(t)$ designates a non-load excitation voltage, the letter Ri designates a resistance component of internal equivalent impedance, and the letter Li designates an inductance component of the internal equivalent impedance. The internal equivalent impedance of the voltage source DC-AC power converter can be computed as follows.

The resistance component Ri of the internal equivalent impedance is expressed by Equation 1:

$$Ri = \frac{1 - \beta G_{PWM}}{\alpha G_{PWM}} [\Omega] \quad (1)$$

where α is a feedback gain, β is a feedforward gain, and $G_{PWM}$ is a current gain of the PWM inverter. The feedback gain α and the feedback gain β correspond to α and β of FIG. 1 of non-patent document 1, and the feedback gain α and the feedback gain β also correspond to α and β of FIG. 1 of non-patent document 2. The gain $G_{PWM}$ corresponds to a gradient of FIG. 2 of non-patent document 1, and the gain $G_{PWM}$ also corresponds to a gradient of FIG. 2 of non-patent document 2.

The inductance component Li of the internal equivalent impedance is expressed by Equation 2:

$$Li = Ri \cdot T_I \quad (2)$$

where $T_I$ is an integration time constant of an integrator to be described below. The detailed description of Equation 2 is omitted.

The non-load excitation voltage $V_{CO}(t)$ is expressed by Equation 3:

$$V_{CO}(t) = \sqrt{2} E_{co} \cdot \sin(\omega_{co} t) \quad (3)$$

First Embodiment

Figure 2:
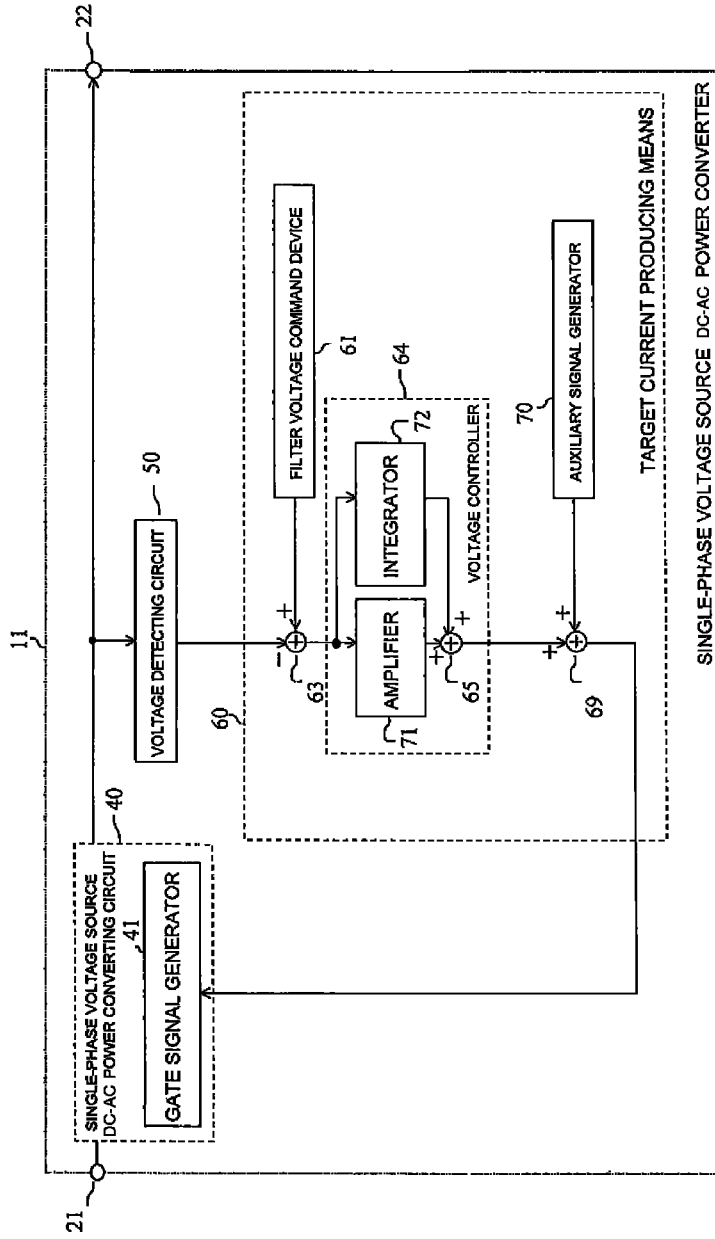
FIG. 2 is a schematic configuration diagram of a single-phase voltage source DC-AC power converter according to the invention.

FIG. 2 is a schematic configuration diagram of a single-phase voltage source DC-AC power converter according to a first embodiment of the invention.

A single-phase voltage source DC-AC power converter 11 of FIG. 2 includes a single-phase voltage source DC-AC power converting circuit 40 and target current producing means 60. The single-phase voltage source DC-AC power converting circuit 40 converts power from a DC voltage source into single-phase AC power according to pulse width of gate signals that are generated based on a PWM scheme, and the single-phase voltage source DC-AC power converting circuit 40 outputs the single-phase AC power from an AC terminal 22. The target current producing means 60 includes a filter voltage command device 61 and a voltage controller 64. The filter voltage command device 61 generates the filter voltage command value that becomes a reference of the single-phase AC power output from the AC terminal 22. The single-phase AC output voltage at the AC terminal 22 is input as an input signal to the voltage controller 64, and the voltage controller 64 integrates a difference between the filter voltage command value from the filter voltage command device 61 and the single-phase AC output voltage at the AC terminal 22. The target current producing means 60 outputs the PWM command such that a DC component included in the single-phase AC output voltage at the AC terminal 22 becomes zero.

The single-phase voltage source DC-AC power converting circuit 40 receives the power from the DC voltage source (not illustrated) at a DC terminal 21 to convert the power into the single-phase AC power according to the pulse width of the gate signals that are generated by a gate signal generator 41 based on the PWM command. Examples of the DC voltage source include a voltage source such as a battery that independently outputs DC voltage, a voltage source in which the power is generated and rectified by a power generation method such as wind-power generation to output the DC voltage, or a voltage source that controls a voltage at a DC capacitor to output the DC voltage. At this point, a blocking inductor is further provided between a connection point of a voltage detecting circuit 50 and the AC terminal 22, and the single-phase output voltage may be output from the AC terminal 22 through the blocking inductor. A PWM component of the single-phase voltage source DC-AC power converting circuit 40 can be prevented from flowing out to the AC terminal 22.

Figure 5:
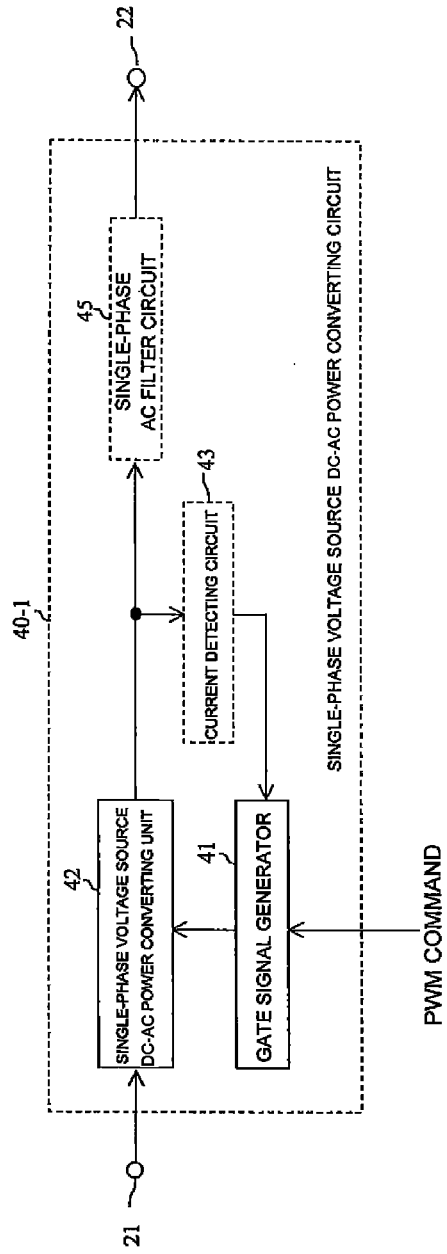
FIG. 5 is a schematic configuration diagram of a single-phase voltage source DC-AC power converting circuit included in the single-phase voltage source DC-AC power converter according to the invention.
Figure 6:
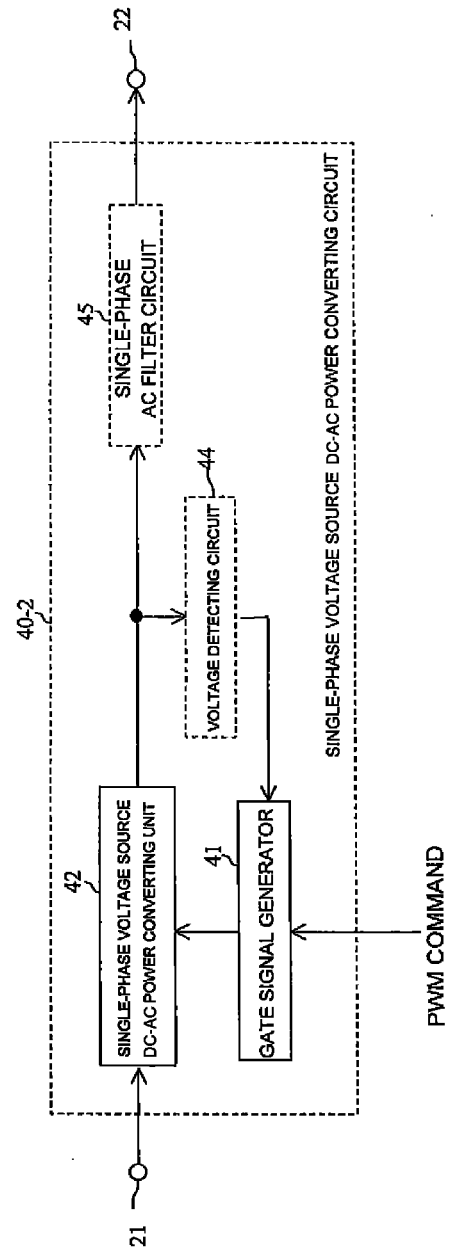
FIG. 6 is a schematic configuration diagram of a single-phase voltage source DC-AC power converting circuit included in the single-phase voltage source DC-AC power converter according to the invention.

FIGS. 5 and 6 are schematic configuration diagrams of a single-phase voltage source DC-AC power converting circuit.

A single-phase voltage source DC-AC power converting circuit 40-1 of FIG. 5 includes a single-phase voltage source DC-AC power converting unit 42, a current detecting circuit 43, a gate signal generator 41, and a single-phase AC filter circuit 45. The single-phase voltage source DC-AC power converting unit 42 has the internal equivalent impedance when viewed from the AC terminal 22, the single-phase voltage source DC-AC power converting unit 42 receives the power from the DC voltage source at the DC terminal 21 according to the pulse width of the gate signals, and the single-phase voltage source DC-AC power converting unit 42 converts the power into the single-phase AC power to output the single-phase AC power. The current detecting circuit 43 detects a single-phase output current of the single-phase voltage source DC-AC power converting unit 42, and the current detecting circuit 43 outputs a signal that is produced according to magnitude of the single-phase output current. The gate signal generator 41 generates and outputs the gate signals such that a difference between the PWM command and the output from the current detecting circuit 43 comes close to zero. The single-phase AC filter circuit 45 removes a high-frequency component caused by the gate signals in the single-phase voltage source DC-AC power converting unit 42 from the single-phase output voltage of the single-phase voltage source DC-AC power converting unit 42, and the single-phase AC filter circuit 45 outputs the single-phase output voltage.

A single-phase voltage source DC-AC power converting circuit 40-2 of FIG. 6 includes a voltage detecting circuit 44 instead of the current detecting circuit 43 of FIG. 5. The voltage detecting circuit 44 detects a single-phase output voltage of the single-phase voltage source DC-AC power converting unit 42, and the voltage detecting circuit 44 outputs a signal that is produced according to magnitude of the single-phase output voltage. At this point, the gate signal generator 41 generates and outputs the gate signal such that a difference between the PWM command and the output from the voltage detecting circuit 44 comes close to zero.

The single-phase voltage source DC-AC power converting unit 42 of FIGS. 5 and 6 may be caused to have the internal equivalent impedance by a control variable in the single-phase voltage source DC-AC power converter 11 of FIG. 2, or the single-phase voltage source DC-AC power converting unit 42 may be caused to have the internal equivalent impedance by connecting a resistor, a reactor, a single-phase transformer, or a combination thereof to the outputs of the single-phase voltage source DC-AC power converting circuits 40-1 and 40-2 of FIGS. 5 and 6. For example, the resistor or the reactor may be series-connected to the single-phase output of each of the single-phase voltage source DC-AC power converting circuits 40-1 and 40-2. When the resistor is connected, the reactor may be series-connected to the subsequent stage of the resistor. The single-phase transformer may be connected to the single-phase output of each of the single-phase voltage source DC-AC power converting circuits 40-1 and 40-2. The single-phase transformer may be connected to the subsequent stage of the reactor, when the reactor is connected to the single-phase output of each of the single-phase voltage source DC-AC power converting circuits 40-1 and 40-2. The single-phase transformer may be connected to the subsequent stage of the reactor, when the reactor is series connected to the subsequent stage of the resistor while the resistor is connected to the single-phase output of each of the single-phase voltage source DC-AC power converting circuits 40-1 and 40-2. Accordingly, the single-phase voltage source DC-AC power converting unit 42 has the internal equivalent impedance, which allows the single-phase voltage source DC-AC power converter 11 of FIG. 2 to be operated while the single-phase voltage source DC-AC power converter 11 is connected as the voltage source to the power system.

When the single-phase voltage source DC-AC power converting circuit 40 of FIG. 2 has the configurations of FIGS. 5 and 6, the single-phase voltage source DC-AC power converter 11 includes the single-phase AC filter circuit 45 (FIGS. 5 and 6), so that the high-frequency component caused by the gate signal in the single-phase voltage source DC-AC power converting unit 42 can be removed from the output of the single-phase voltage source DC-AC power converting unit 42. The current detecting circuit 43 or the voltage detecting circuit 44 detects the current or the voltage from the single-phase voltage source DC-AC power converting unit 42, and the gate signal generator 41 generates the gate signal such that the difference between the PWM command and the output from the current detecting circuit 43 or the voltage detecting circuit 44 comes close to zero. Therefore, a current error can be controlled so as to fall within an allowable range, or the output voltage can track the PWM command.

Figure 7:
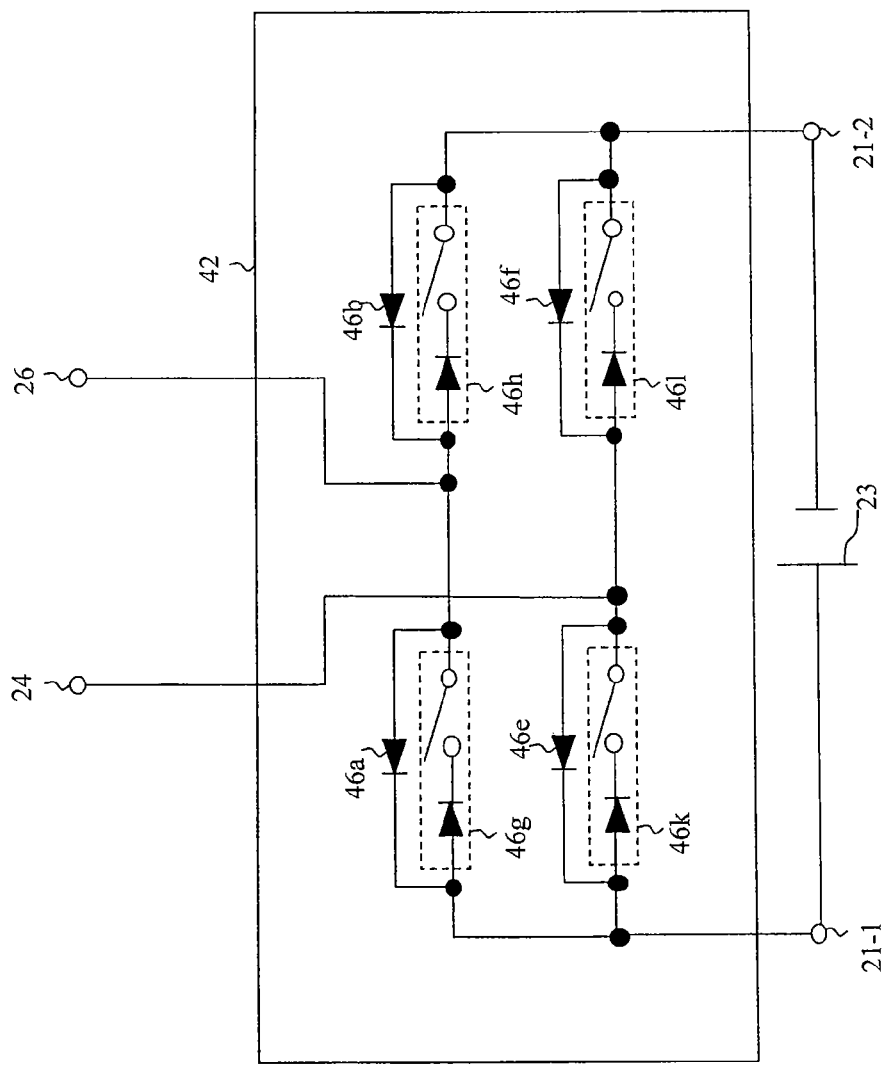
FIG. 7 is a schematic configuration diagram of a single-phase voltage source DC-AC power converting unit in the single-phase voltage source DC-AC power converting circuit included in the single-phase voltage source DC-AC power converter according to the invention.
Figure 8:
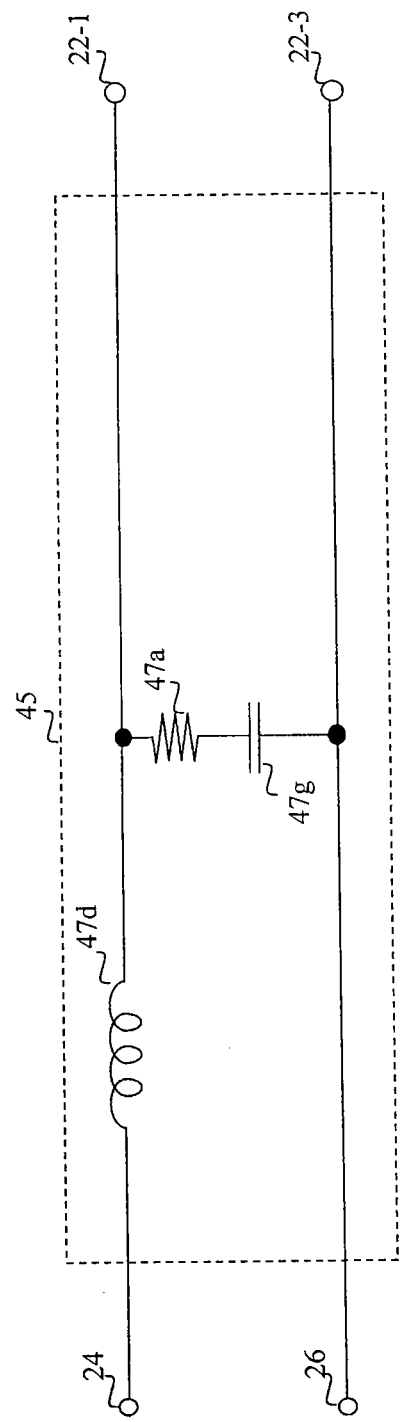
FIG. 8 is a schematic configuration diagram of a single-phase AC filter circuit in the single-phase voltage source DC-AC power converting circuit included in the single-phase voltage source DC-AC power converter according to the invention.

FIG. 7 illustrates a schematic configuration diagram of the single-phase voltage source DC-AC power converting unit 42 of FIGS. 5 and 6. FIG. 8 is a schematic configuration diagram of the single-phase AC filter circuit 45 of FIGS. 5 and 6.

The single-phase voltage source DC-AC power converting unit 42 of FIG. 7 includes four self-commutated switches 46g, 46h, 46k, and 46l and four diodes 46a, 46b, 46e, and 46f. The self-commutated switches 46g, 46h, 46k, and 46l are elements each of which switches turn-on/off in response to on/off of the gate signal. Examples of the self-commutated switch include MOSFET (MOS Field Effect Transistor) and IGBT (Insulating Gate Bipolar Transistor). The gate signal is input as the input signal from the gate signal generator 41 of FIG. 5 or FIG. 6 to the single-phase voltage source DC-AC power converting unit 42. In the single-phase voltage source DC-AC power converting unit 42, the turn on/off of the four switches is switched by the pulse signal in each of the four self-commutated switches 46g, 46h, 46k, and 46l in response to the gate signal, which allows the power from the DC voltage source 23 to be converted into the single-phase AC power to output the single-phase AC power from the AC terminals 24 and 26. The output voltage can vary depending on the pulse width of the pulse signals. In FIG. 7, the DC terminals 21-1 and 21-2 correspond to the DC terminal 21 of FIG. 2, which is a schematic diagram.

The single-phase AC filter circuit 45 of FIG. 8 includes an inductor 47d, a resistor 47a, and a capacitor 47g between input-side AC terminals 24 and 26 and output-side AC terminals 22-1 and 22-3. The single-phase output from the single-phase voltage source DC-AC power converting unit 42 of FIG. 5 or FIG. 6 is received at the input-side AC terminals 24 and 26, and the single-phase output is output from the output-side AC terminals 22-1 and 22-3. The resistor 47a and the capacitor 47g are connected between the AC terminal 22-1 and the AC terminal 22-3. A capacitance of each of the current control inductor 47d, the resistor 47a, and the capacitor 47g can appropriately be determined according to a frequency characteristic of the output signal from the output-side AC terminals 22-1 and 22-3. Alternatively, the resistor 47a may be removed to connect the capacitor 47g between the AC terminal 22-1 and the AC terminal 22-3. The inductor 47d may be a transformer. In the single-phase voltage source DC-AC power converting circuits 40-1 and 40-2 of FIGS. 5 and 6, the single-phase AC filter circuit 45 of FIG. 8 can be used as the single-phase AC filter circuit 45 to remove the high-frequency component caused by the gate signals in the single-phase voltage source DC-AC power converting unit 42. In FIG. 8, the AC terminals 22-1 and 22-3 correspond to the AC terminal 22 of FIG. 2, which is a schematic diagram.

The target current producing means 60 of FIG. 2 includes a filter voltage command device 61 and a voltage controller 64. The filter voltage command device 61 generates a filter voltage command value that becomes a reference of the single-phase AC power output from the AC terminal 22. The single-phase AC output voltage at the AC terminal 22 is input as the input signal to the voltage controller 64, and the voltage controller 64 integrates the difference between the filter voltage command value from the filter voltage command device 61 and the single-phase AC output voltage at the AC terminal 22. The target current producing means 60 outputs the PWM command such that a DC component included in the single-phase AC output voltage at the AC terminal 22 becomes zero.

For example, the filter voltage command device 61 is an ideal AC signal generator that generates an ideal AC signal. An adder 63 computes the difference between the filter voltage command value output from the filter voltage command device 61 and the single-phase AC output voltage at the AC terminal 22, and the adder 63 inputs the computed difference value as the input signal to the voltage controller 64. The voltage controller 64 includes an amplifier 71 and an integrator 72. The voltage controller 64 receives the input signal and the signal is input to both the amplifier 71 and the integrator 72.

The amplifier 71 amplifies the input signal with a predetermined gain α. The gain α of the amplifier 71 is the feedback gain α of Equation 1. A phase-lag element may be provided in the amplifier 71. In such cases, using a time constant $T_L$, a transfer function of the amplifier 71 is expressed by Equation 4:

$$\frac{\alpha}{1+T_L \cdot S} \quad (4)$$

The integrator 72 integrates the input signal. Using the time constant $T_I$ of the integrator of Equation 2, a transfer function of the integrator 72 is expressed by Equation 5. The biased magnetization of the transformer connected to the AC terminal 22 of FIG. 2 can be prevented by adjusting the integration time constant.

$$\frac{\alpha}{T_I \cdot S} \quad (5)$$

When the phase-lag element is not provided in the amplifier 71, the time constant $T_L$ of Equation 4 is zero, and the transfer function of the amplifier 71 becomes α by substituting zero for the time constant $T_L$ of Equation 4. Therefore, in consideration of the transfer function of the integrator 72 located in parallel, the transfer function of the voltage controller 64 in the single-phase voltage source DC-AC power converter 11 of FIG. 3 becomes $\alpha(1+1/(T_I S))$.

In the voltage controller 64, an adder 65 adds the output of the amplifier 71 and the output of the integrator 72, and the adder 65 outputs the PWM command such that a DC component included in the single-phase AC output voltage at the AC terminal 22 becomes zero. The target current producing means 60 may further include an auxiliary signal generator 70. The auxiliary signal generator 70 adds an auxiliary signal to the PWM command output from the voltage controller 64. The loss and deviation of the single-phase output current can be compensated by the addition of the auxiliary signal, and the stabilization of the output voltage can be achieved to the change in load current.

The PWM command output from the target current producing means 60 is input to the gate signal generator 41 of the single-phase voltage source DC-AC power converting circuit 40. Therefore, even if the DC component is superimposed on the PWM command due to the external factor and therefore the DC component is superimposed on the single-phase AC output voltage, the integrator 72 can detect the DC component, and the DC component included in the PWM command can be canceled by adding the integration value to the output of the amplifier 71. Accordingly, the DC component superimposed on the single-phase AC output voltage at the AC terminal 22 can be removed.

Figure 3:
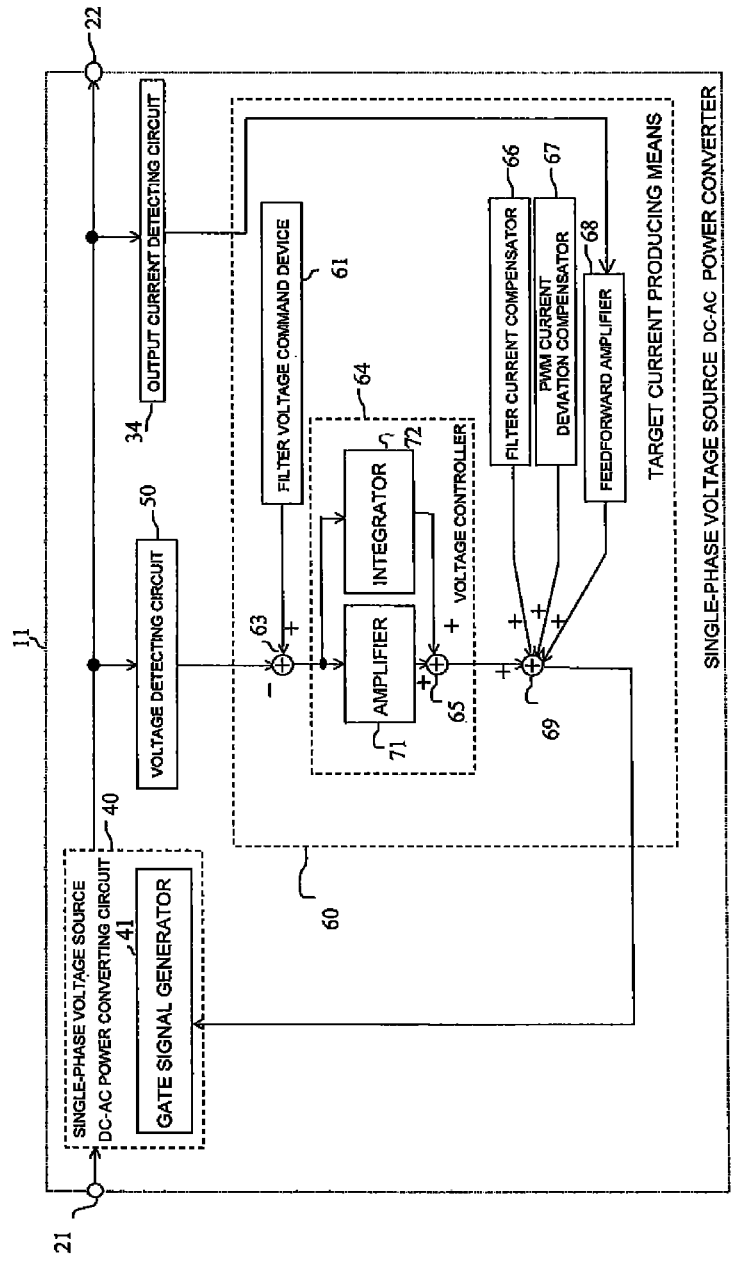
FIG. 3 is a schematic configuration diagram of a single-phase voltage source DC-AC power converter according to the invention.

FIG. 3 is a schematic configuration diagram of the single-phase voltage source DC-AC power converter in order to describe the detailed auxiliary signal generator 70 of the single-phase voltage source DC-AC power converter 11 of FIG. 2.

The single-phase voltage source DC-AC power converter 11 of FIG. 3 further includes an output current detecting circuit 34 in addition to the single-phase voltage source DC-AC power converter 11 of FIG. 2. The output current detecting circuit 34 detects the single-phase AC output current at the AC terminal 22, and the output current detecting circuit 34 inputs the detected current value as the input signal to the target current producing means 60. The target current producing means 60 further includes a filter current compensator 66, a PWM current deviation compensator 67, and a feedforward amplifier 68. The filter current compensator 66 adds a current compensation value to the PWM command output from the voltage controller 64, and the current compensation value is defined so as to compensate a current loss in the single-phase AC filter circuit of the single-phase voltage source DC-AC power converting circuit 40. The PWM current deviation compensator 67 adds a current deviation compensation value to the PWM command output from the voltage controller 64, and the current deviation compensation value is defined so as to compensate a current deviation of the single-phase AC output current caused by PWM in the single-phase voltage source DC-AC power converting circuit 40. The feedforward amplifier 68 amplifies the detected current value input from the output current detecting circuit 34 with a predetermined gain, adds the detected current value to the PWM command output from the voltage controller 64, and compensates a fluctuation in single-phase AC output voltage caused by the change in single-phase AC output current at the AC terminal 22. At this point, one of the single-phase voltage source DC-AC power converting circuits 40-1 and 40-2 of FIGS. 5 and 6 can be used as the single-phase voltage source DC-AC power converting circuit 40.

The filter current compensator 66 outputs the current compensation value, and the current compensation value is defined so as to compensate the current loss in the single-phase AC filter circuit 45 (FIG. 5 or FIG. 6) of the single-phase voltage source DC-AC power converting circuit 40. Therefore, in the single-phase voltage source DC-AC power converter 11, the current loss in the single-phase AC filter circuit 45 of FIG. 5 or FIG. 6 is previously set in the filter current compensator 66, and the current loss can be compensated by adding the current loss to the PWM command from the voltage controller 64.

The PWM current deviation compensator 67 outputs the current deviation compensation value, and the current deviation compensation value is defined so as to compensate the current deviation of the single-phase output current caused by PWM in the single-phase voltage source DC-AC power converting circuit 40. Therefore, in the single-phase voltage source DC-AC power converter 11, when the PWM command is set to zero, the current deviation in the single-phase voltage source DC-AC power converting circuit 40 is previously set in the PWM current deviation compensator 67, and the current loss can be compensated by adding the current deviation to the PWM command from the voltage controller 64.

The feedforward amplifier 68 amplifies the current passed through the AC terminal 22 with a predetermined gain $\beta$ so as to compensate the output current based on the detected current value input from the output current detecting circuit 34 and outputs the current. The gain $\beta$ of the feedforward amplifier 68 is the feedforward gain $\beta$ of Equation 1. Therefore, in the single-phase voltage source DC-AC power converter 11, the output current detecting circuit 34 detects the single-phase output current at the AC terminal 22, and the detected current value is passed through the feedforward amplifier 68 and added to the PWM command from the voltage controller 64, so that the output voltage can be stably generated even if the load current is changed.

Figure 4:
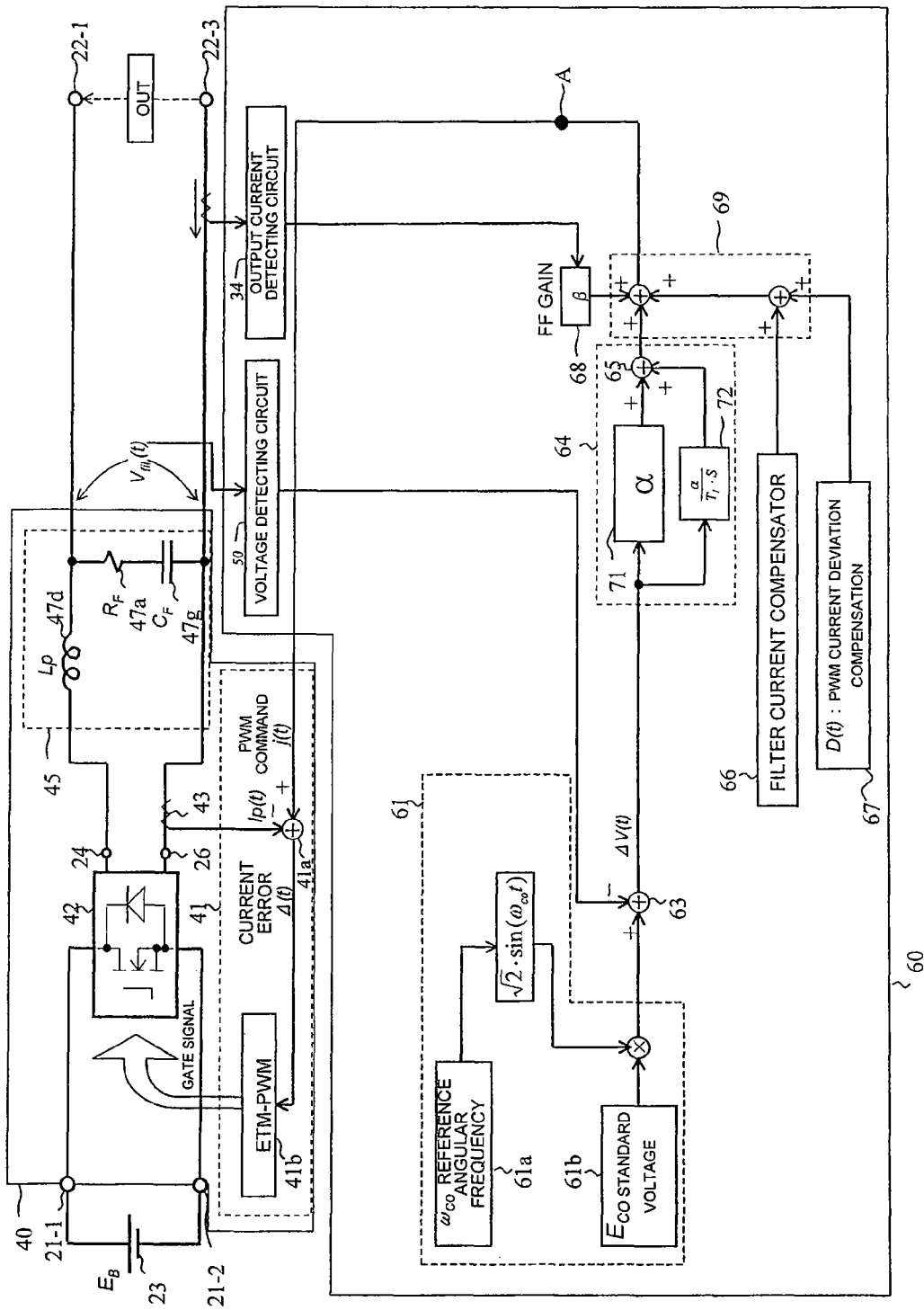
FIG. 4 is a specific configuration diagram of a single-phase voltage source DC-AC power converter according to the invention.

FIG. 4 illustrates a specific example of the single-phase voltage source DC-AC power converter of FIG. 3, and a specific component that is not described yet with reference to FIG. 3 will be described below.

The target current producing means 60 receives output Vfil(t) of the single-phase AC filter circuit 45, which is detected by the voltage detecting circuit 50, as the single-phase AC output voltage at the AC terminal 22.

The filter voltage command device 61 includes a reference frequency generating unit 61a and a standard voltage generating unit 61b, and the filter voltage command device 61 generates the ideal AC signal that is expressed as the filter voltage command value by Equation 3. The adder 63 outputs a difference $\Delta V(t)$ between the filter voltage command value from the filter voltage command device 61 and the output Vfil(t) of the single-phase AC filter circuit 45.

The gate signal generator 41 includes an adder 41a and a PWM control means 41b. In the gate signal generator 41, an error $\Delta(t)$ between a PWM command j(t) output from the target current producing means 60 and an output current Ip(t) detected by the current detecting circuit 43 is obtained, the error $\Delta(t)$ is input to the PWM control means 41b, and the PWM control means 41b generates the gate signals based on the error $\Delta(t)$. The gate signal generator 41 inputs the generated gate signals to the single-phase voltage source DC-AC power converting unit 42.

The single-phase voltage source DC-AC power converter of FIG. 4 is operated similarly to the single-phase voltage source DC-AC power converters 11 of FIGS. 2 and 3. The single-phase voltage source DC-AC power converter of FIG. 4 can convert the power from the DC voltage source 23 into the single-phase AC power to output the single-phase AC power from AC terminals 22-1 and 22-3. In FIG. 4, the letter $E_B$ designates the DC voltage value of the DC voltage source 23, the letter $I_p(t)$ designates the single-phase AC current value output from the single-phase voltage source DC-AC power converting unit 42, the letter $L_p$ designates inductance of an inductor 47d, the letter $R_F$ designates a resistance value of a resistor 47a, and the letter $C_F$ designates capacitance of a capacitor 47g.

Figure 14:
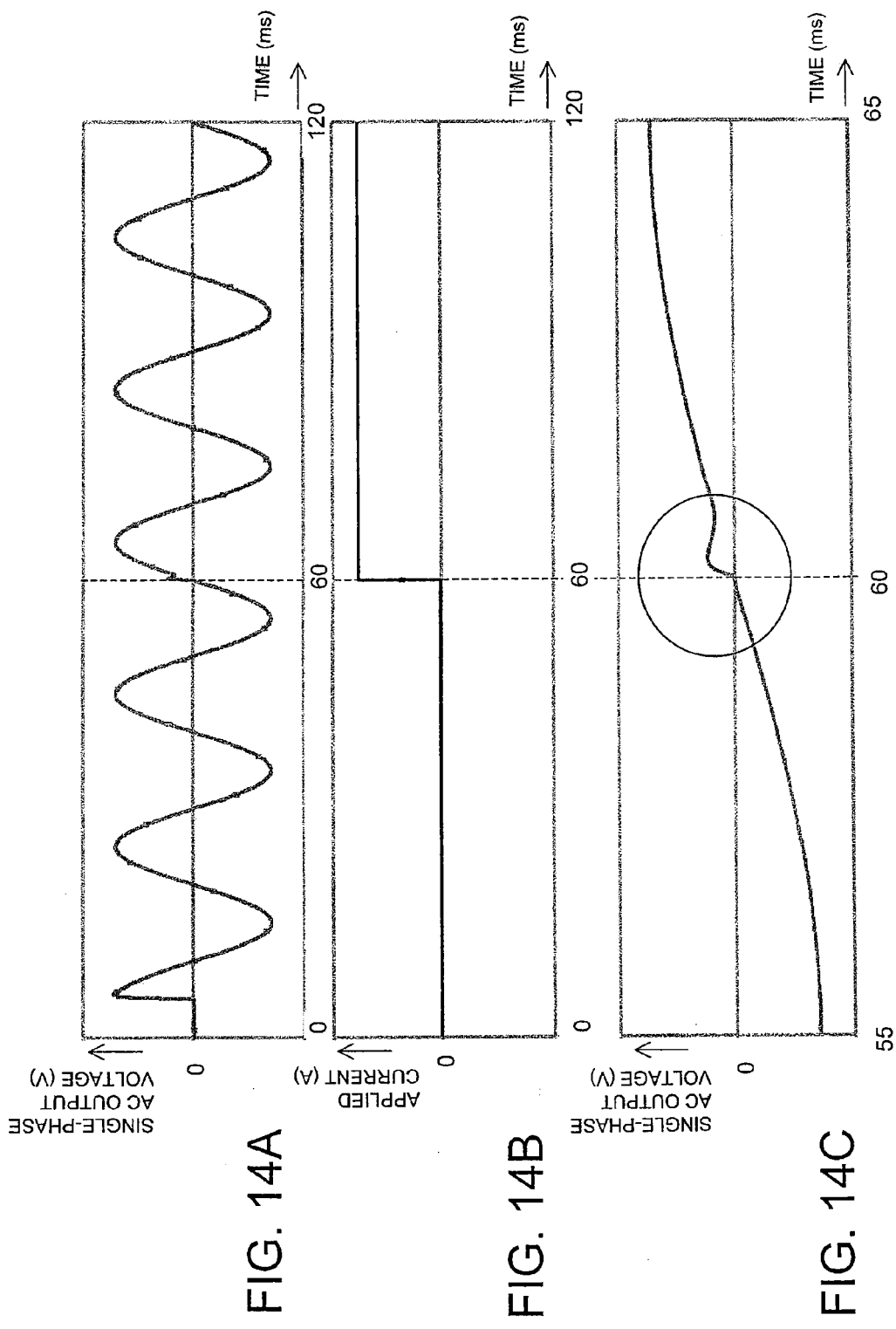
FIG. 14A illustrates output Vfil(t) of a single-phase AC filter circuit 45 that is of a single-phase AC output voltage at an AC terminal 22.
FIG. 14B illustrates DC current applied to a PWM signal.
FIG. 14C is an enlarged view of the output Vfil(t) from a control time of 55 milliseconds to a control time of 65 milliseconds.
Figure 15:
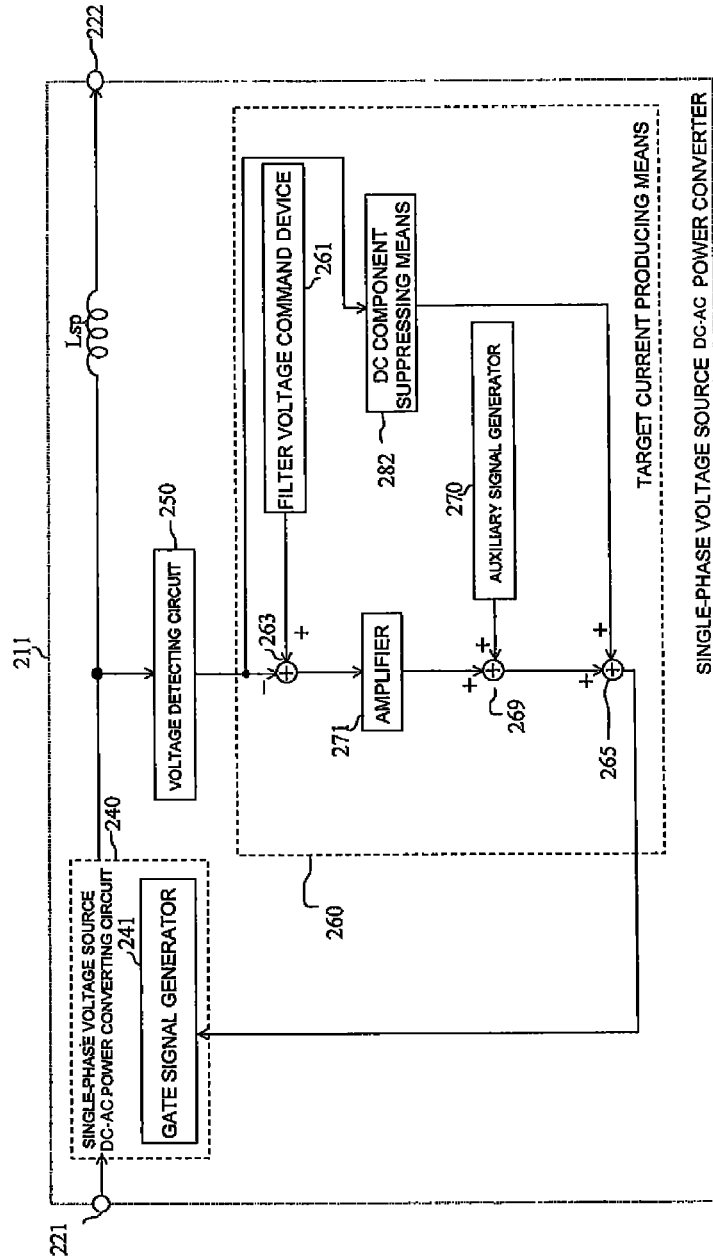
FIG. 15 is a schematic configuration diagram of a conventional single-phase voltage source DC-AC power converter.
Figure 16:
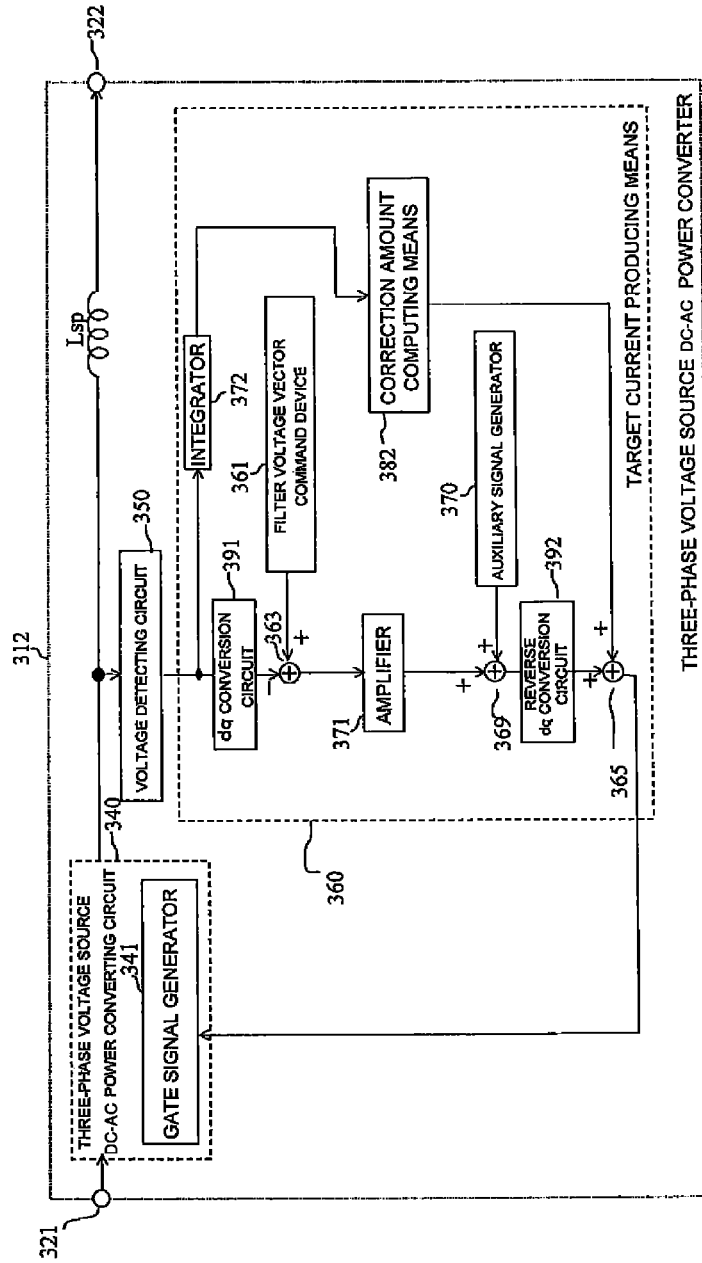
FIG. 16 is a schematic configuration diagram of a conventional three-phase voltage source DC-AC power converter.

An experiment in which the DC component is added to the PWM command j (t) was made in order to confirm the effect of the single-phase voltage source DC-AC power converter of FIG. 4. FIG. 14A illustrates the output Vfil(t) of the single-phase AC filter circuit 45, which is of the single-phase AC output voltage at the AC terminal 22. FIG. 14B illustrates the DC current applied to the PWM signal. Specifically the DC current is applied to the PWM command j(t) at the point A of FIG. 4. FIG. 14C is an enlarged view illustrating the output Vfil(t) from a control time of 55 milliseconds of FIG. 14A to a control time of 65 milliseconds. At the control time of 60 milliseconds since the PWM control is started, when the DC component is applied to the PWM command, the DC component is superimposed to increase the voltage in the output Vfil(t) as illustrated by a portion surrounded by a circle of FIG. 14C. However, it was confirmed that the DC component is removed by the control of the target current producing means 60.

Second Embodiment

Figure 9:
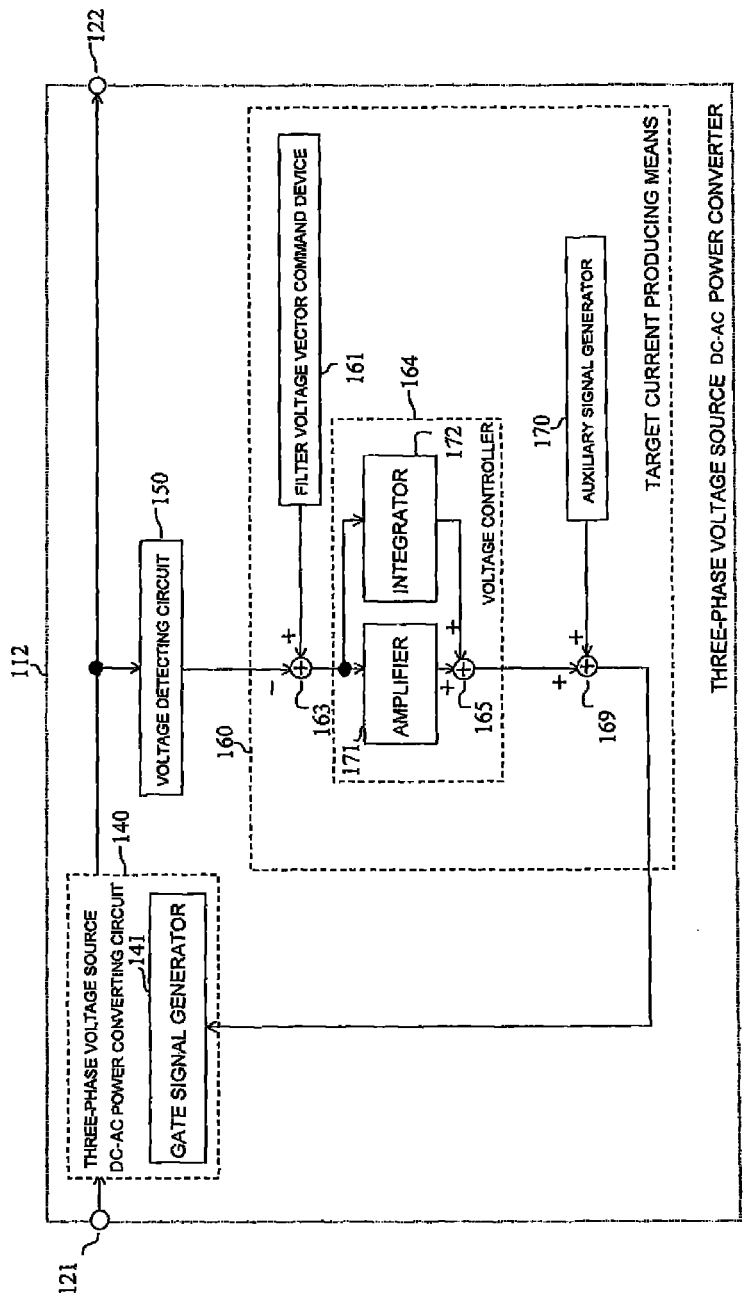
FIG. 9 is a schematic configuration diagram of a three-phase voltage source DC-AC power converter according to the invention.

FIG. 9 illustrates a schematic configuration diagram of a three-phase voltage source DC-AC power converter according to a second embodiment of the invention.

A three-phase voltage source DC-AC power converter 112 of FIG. 9 includes a three-phase voltage source DC-AC power converting circuit 140 and target current producing means 160. The three-phase voltage source DC-AC power converting circuit 140 converts the power from the DC voltage source into three-phase AC power according to the pulse width of the gate signals that are generated based on the PWM scheme, and the three-phase voltage source DC-AC power converting circuit 140 outputs the three-phase AC power from an AC terminal 122. The target current producing means 160 includes a filter voltage vector command device 161 and a voltage controller 164. The filter voltage vector command device 161 generates the filter voltage command vector that is a reference of the three-phase AC power output from the AC terminal 122. The three-phase AC output voltages at the AC terminal 122 is input as an input signal to the voltage controller 164, and the voltage controller 164 integrates a difference between the filter voltage command vector from the filter voltage vector command device 161 and the three-phase AC output voltages at the AC terminal 122. The target current producing means 160 outputs the PWM command such that a DC component included in the three-phase AC output voltage at the AC terminal 122 becomes zero. In the three-phase voltage source DC-AC power converter 112, each component of the single-phase voltages source DC-AC power converter 11 of the first embodiment is replaced with a three-phase AC component.

That is, in FIG. 9, a DC terminal 121, the AC terminal 122, the single-phase voltage source DC-AC power converting circuit 140, a gate signal generator 141, the target current producing means 160, the filter voltage vector command device 161, the voltage controller 164, an amplifier 166, an integrator 167, an adder 163, an adder 165, and an auxiliary signal generator 170 correspond to and are operated similarly to the DC terminal 21, the AC terminal 22, the single-phase voltage source DC-AC power converting circuit 40, the gate signal generator 41, the target current producing means 60, the filter voltage command device 61, the voltage controller 64, the amplifier 66, the integrator 67, the adder 63, the adder 65, and the auxiliary signal generator 70 of FIG. 2. The filter voltage vector command device 161 outputs the filter voltage command vector that is the reference of the three-phase AC power output from the AC terminal 122.

As with the single-phase voltage source DC-AC power converter 11 of FIG. 2, in the three-phase voltage source DC-AC power converter 112 of FIG. 9, the voltage controller 164 includes the integrator 172 and the amplifier 171. As with the amplifier 71 of FIG. 2, the amplifier 171 amplifies the input signal with the predetermined gain α. The phase-lag element may be provided in the amplifier 171. At this point, as with the amplifier 71, the transfer function of the amplifier 171 is expressed by Equation 4. The integrator 172 integrates the difference between the filter voltage command vector and the vector of the three-phase AC output voltages at the AC terminal 122. Therefore, the voltage controller 164 adds the output of the integrator 172 to the output of the amplifier 171, and the voltage controller 164 outputs the PWM command such that the DC component becomes zero, which allows the suppression of the superimposition of the DC component on each phase of the three-phase AC output voltages. Accordingly, the three-phase voltage source DC-AC power converter 112 controls the three-phase AC voltage similarly to the control of the single-phase AC voltage by the single-phase voltage source DC-AC power converter 11 of the first embodiment.

Figure 10:
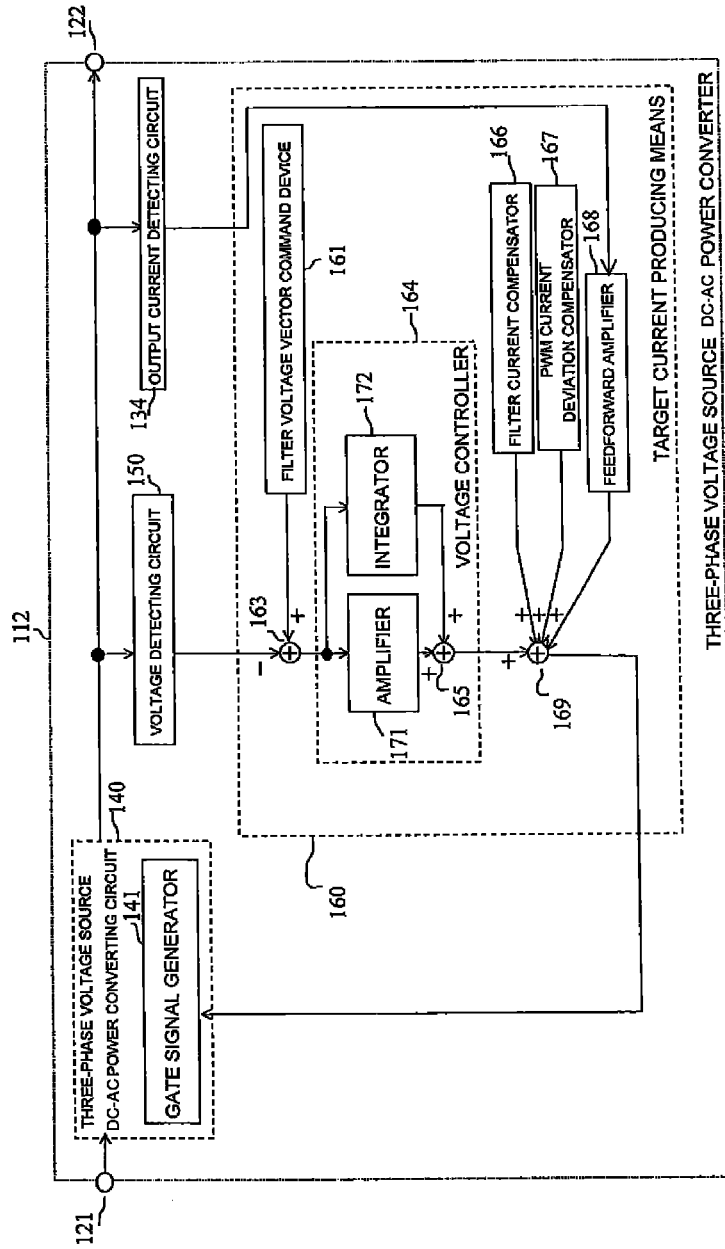
FIG. 10 is a schematic configuration diagram of a three-phase voltage source DC-AC power converter according to the invention.

FIG. 10 illustrates a schematic configuration diagram of the three-phase voltage source DC-AC power converter in order to describe the detailed auxiliary signal generator 170 of the single-phase voltage source DC-AC power converter 112 of FIG. 9.

The three-phase voltage source DC-AC power converter 112 of FIG. 10 further includes an output current detecting circuit 134 in addition to the three-phase voltage source DC-AC power converter 112 of FIG. 9. The output current detecting circuit 134 detects the three-phase AC output currents at the AC terminal 122, and the output current detecting circuit 134 inputs the detected current value as the input signal to the target current producing means 160. The target current producing means 160 further includes a filter current compensator 166, a PWM current deviation compensator 167, and a feedforward amplifier 168. The filter current compensator 166 adds a current compensation vector to the PWM command output from the voltage controller 164, and the current compensation vector is defined so as to compensate a current loss in the three-phase AC filter circuit of the three-phase voltage source DC-AC power converting circuit 140. The PWM current deviation compensator 167 adds a current deviation compensation vector to the PWM command output from the voltage controller 164, and the current deviation compensation vector is defined so as to compensate a current deviation of the three-phase AC output currents caused by PWM in the three-phase voltage source DC-AC power converting circuit 140. The feedforward amplifier 168 amplifies the detected current value input from the output current detecting circuit 134 with a predetermined gain, adds the detected current value to the PWM command output from the voltage controller 164, and compensates a fluctuation in three-phase AC output voltages caused by the change in three-phase AC output currents at the AC terminal 122.

In FIG. 10, the output current detecting circuit 134, the filter current compensator 166, the PWM current deviation compensator 167, and the feedforward amplifier 168 correspond to and are operated similarly to the output current detecting circuit 34, the filter current compensator 66, the PWM current deviation compensator 67, and the feedforward amplifier 68 of FIG. 3. Therefore, in the three-phase voltage source DC-AC power converter 112 of FIG. 10, the filter current compensator 166 can compensate the current loss in the three-phase AC filter of the three-phase voltage source DC-AC power converting circuit 140, the PWM current deviation compensator 167 can compensate the loss of the current deviation of the single-phase output current from the three-phase voltage source DC-AC power converting circuit 140, and the feedforward amplifier 168 can stably generate the output voltages even if the load current is changed.

Figure 11:
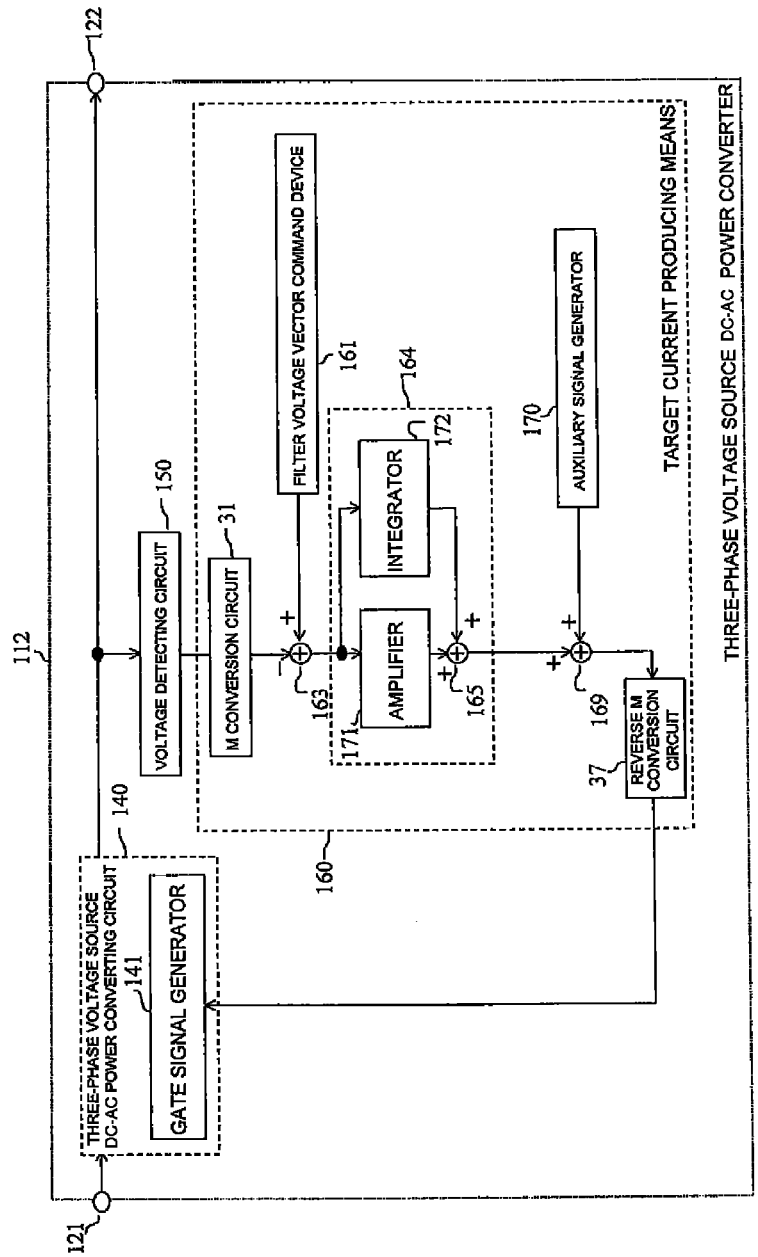
FIG. 11 is a schematic configuration diagram of a three-phase voltage source DC-AC power converter according to the invention.
Figure 12:
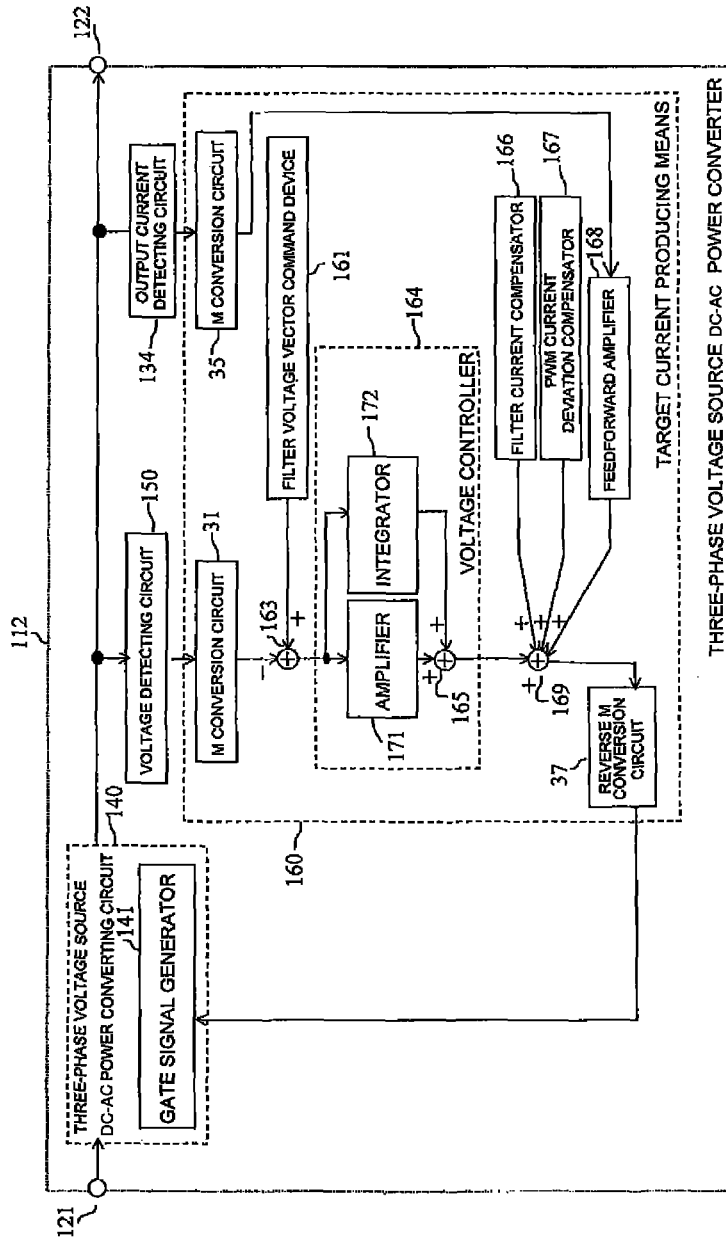
FIG. 12 is a schematic configuration diagram of a three-phase voltage source DC-AC power converter according to the invention.

FIGS. 11 and 12 illustrate schematic configuration diagrams of other three-phase voltage source DC-AC power converter of the second embodiment.

The three-phase voltage source DC-AC power converter 112 of FIGS. 11 and 12 further includes an M conversion circuit in addition to the three-phase voltage source DC-AC power converter 112 of FIGS. 9 and 10. The M conversion circuit converts the input signal input to the target current producing means 160 into a signal on an αβ coordinate space having an α-axis and a β-axis, which are orthogonal to each other based on one of three phases, and the M conversion circuit inputs the signal on the αβ coordinate space to the target current producing means 160.

In the three-phase voltage source DC-AC power converter 112 of FIG. 11, the three-phase AC output voltages at the AC terminal 122 is used as the input signal input to the target current producing means 160. In the three-phase voltage source DC-AC power converter 112 of FIG. 11, the M conversion circuit 31 converts the three-phase AC output voltages at the AC terminal 122 into the voltage on the αβ coordinate space having the α-axis and the β-axis, which are orthogonal to each other based on one of the three-phase output voltages at the AC terminal 122, and the M conversion circuit 31 inputs the voltage on the αβ coordinate space to the adder 163 of the target current producing means 160. The M conversion circuit 31 performs the M conversion of the three-phase AC output voltages at the AC terminal 122 into the voltage on the αβ coordinate space, so that both the amplitude and the frequency of the three-phase AC output power of the three-phase voltage source DC-AC power converter 112 with respect to the amplitude and the frequency of the power system can be detected even if the amplitude and the frequency of the power system are changed.

When feedforward of the current value detected by the output current detecting circuit 134 is performed as illustrated in FIG. 10, the three-phase voltage source DC-AC power converter 112 further includes an M conversion circuit 35 as illustrated in FIG. 12. In the three-phase voltage source DC-AC power converter 112 of FIG. 12, the current value detected by the output current detecting circuit 134 is also used as the input signal input to the target current producing means 160. In the three-phase voltage source DC-AC power converter 112 of FIG. 12, the M conversion circuit 35 converts the current value detected by the output current detecting circuit 134 into the current value on the αβ coordinate space having the α-axis and the β-axis, which are orthogonal to each other based on one of the current values detected by the output current detecting circuit 134, and the M conversion circuit 35 inputs the current value on the αβ coordinate space to the feedforward amplifier 168 of the target current producing means 160.

Figure 13:
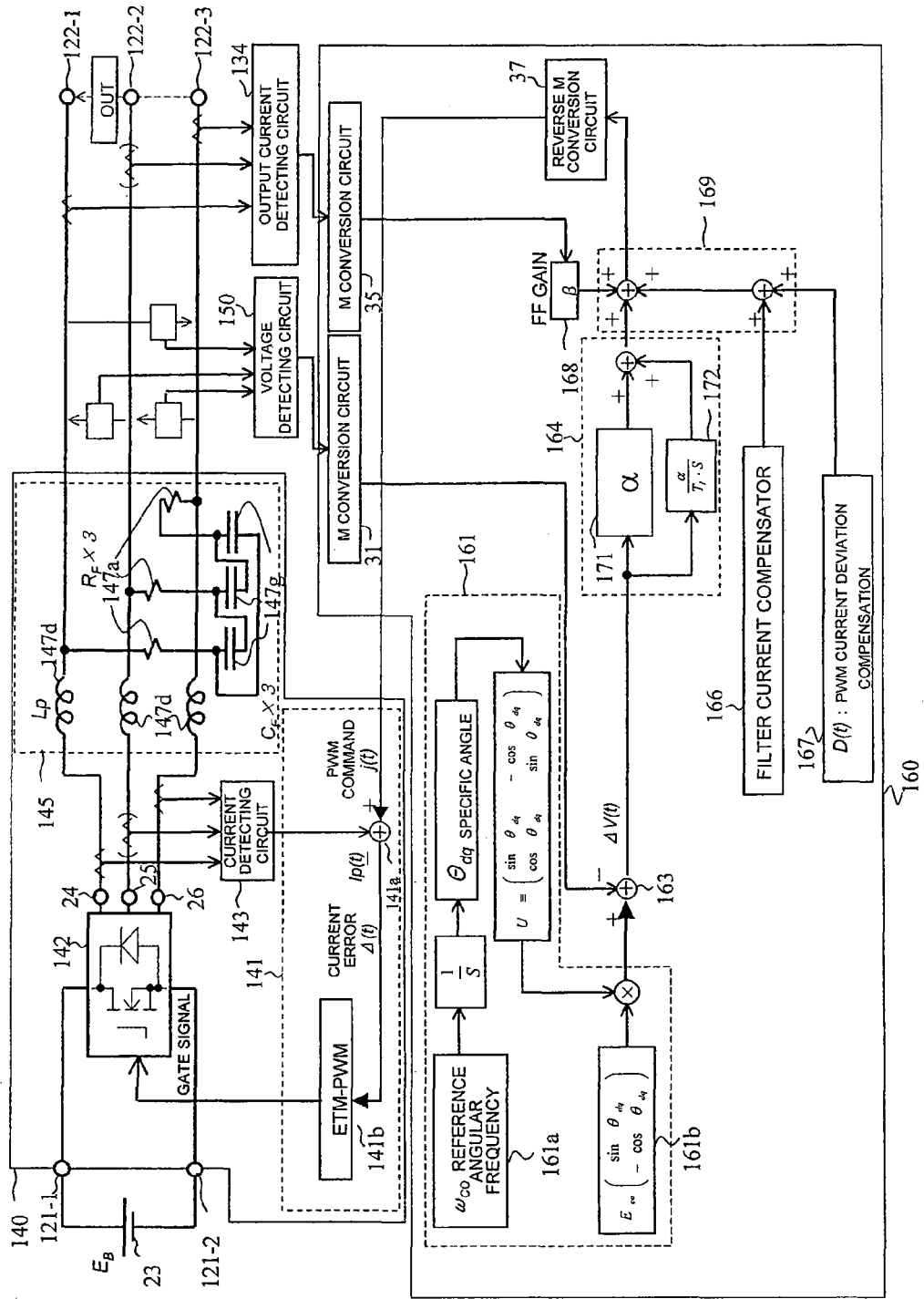
FIG. 13 is a specific configuration diagram of a three-phase voltage source DC-AC power converter according to the invention.

FIG. 13 illustrates a specific example of the three-phase voltage source DC-AC power converter 112 of FIG. 12. A specific component that is not described yet with reference to FIG. 12 will be described below.

In the target current producing means 160, a voltage detecting circuit 150 detects the output Vfil(t) between the phases of the three-phase AC filter circuit 145, and the M conversion circuit 31 performs the M conversion of the output Vfil(t) while the output Vfil(t) is received as the three-phase AC output voltages at the AC terminal 122. In the target current producing means 160, the output current detecting circuit 134 detects the AC current of each phase, and the M conversion circuit 35 performs the M conversion of the AC current while the AC current is received as the detected current value.

The filter voltage vector command device 161 includes a reference frequency generating unit 161a and a standard voltage vector generating unit 161b, and the filter voltage vector command device 161 generates the ideal AC signal that is expressed as the filter voltage command vector by Equation 3. The adder 163 outputs a difference vector ΔV(t) between the filter voltage command vector from the filter voltage vector command device 161 and the output Vfil(t) between the phases of the three-phase AC filter circuit 145.

The gate signal generator 141 includes an adder 141a and a PWM control means 141b. In the gate signal generator 141, an error vector Δ(t) between the PWM command j(t) output from the target current producing means 160 and a value obtained by M-converting an output current Ip(t) of each phase detected by the current detecting circuit 143 is obtained, the error vector Δ(t) is input to the PWM control means 141b, and the PWM control means 141b generates the gate signal based on the error vector Δ(t). The gate signal generator 141 inputs the generated gate signal to the three-phase voltage source DC-AC power converting unit 142.

The three-phase voltage source DC-AC power converter of FIG. 13 is operated similarly to the three-phase voltage source DC-AC power converter 112 of FIG. 12, and the three-phase voltage source DC-AC power converter of FIG. 13 can convert the power from the DC voltage source 23 into the three-phase AC power to output the three-phase AC power from AC terminals 122-1 and 122-3. In FIG. 13, the letter $E_B$ designates the DC voltage value of the DC voltage source 23, the letter $I_p(t)$ designates the AC current value of each phase output from the three-phase voltage source DC-AC power converting unit 142, the letter $L_p$ designates inductance of an inductor 147d, the letter $R_F$ designates a resistance value of a resistor 147a, and the letter $C_F$ designates capacitance of a capacitor 147g.

INDUSTRIAL APPLICABILITY

In addition to the UPS (Uninterruptible Power System) in which the parallel redundant operation is required, the single-phase voltage source DC-AC power converter and the three-phase voltage source DC-AC power converter of the invention can be applied to dispersed power source inverters such as a photovoltaic system inverter, a fuel cell inverter, an inverter for power storage system, and an inverter for DC-linked wind-power generation, rectifiers, and SVC (Static Var Compensator). The single-phase voltage source DC-AC power converter of the invention can be operated while connected to a single-phase three-wire system circuit.

| Reference Numerals | |
| --- | --- |
| 11 and 211: | single-phase voltage source DC-AC power converter |
| 112 and 312: | three-phase voltage source DC-AC power converter |
| 21, 21-1, 21-2, 121, 221, and 321: | DC terminal |
| 22, 22-1, 22-2, 22-3, 122, 122-1, 112-2, | AC terminal |

-continued

Reference Numerals

| | |
|---|---|
| 112-3, 222, and 322: | |
| 23: | DC voltage source |
| 24, 25, and 26: | AC terminal |
| 31 and 35: | M conversion circuit |
| 37: | reverse M conversion circuit |
| 34 and 134: | output current detecting circuit |
| 40 and 240: | single-phase voltage source DC-AC power converting circuit |
| 140 and 340: | three-phase voltage source DC-AC power converting circuit |
| 40-1 and 40-2: | single-phase voltage source DC-AC power converting circuit |
| 41, 141, 241, and 341: | gate signal generator |
| 41a and 141a: | adder |
| 41b and 141b: | PWM control means |
| 42: | single-phase voltage source DC-AC power converting unit |
| 142: | three-phase voltage source DC-AC power converting unit |
| 43: | current detecting circuit |
| 44: | voltage detecting circuit |
| 45: | single-phase AC filter circuit |
| 145: | three-phase AC filter circuit |
| 46a, 46b, 46e, and 46f: | diode |
| 46g, 46h, 46k, and 461: | self-commutated switch |
| 47a and 147a: | resistor |
| 47d and 147d: | inductor |
| 47g and 147g: | capacitor |
| 50, 150, 250, and 350: | voltage detecting circuit |
| 60, 160, 260, and 370: | target current producing means |
| 61 and 261: | filter voltage command device |
| 161 and 361: | filter voltage vector command device |
| 61a and 161a: | reference frequency generating unit |
| 61b and 161b: | standard voltage generating unit |
| 63, 65, 69, 163, 165, 169, 263, 265, 269, 363, 365, and 369: | adder |
| 64 and 164: | voltage controller |
| 66 and 166: | filter current compensator |
| 67 and 167: | PWM current deviation compensator |
| 68 and 168: | feedforward amplifier |
| 70, 170, 270, and 370: | auxiliary signal generator |
| 71, 171, 271, and 371: | amplifier |
| 72, 172, and 372: | integrator |
| 282: | DC component suppressing means |
| 382: | correction amount computing means |
| 391: | dq conversion circuit |
| 392: | reverse dq conversion circuit |

The invention claimed is:

1. A three-phase voltage source DC-AC power converter comprising:
a three-phase voltage source DC-AC power converting circuit that converts power from a DC voltage source into three-phase AC power according to a pulse width of gate signals that are generated based on a PWM scheme, and outputs the three-phase AC power from an AC terminal;
target current, producing means that includes a filter voltage vector command device and a voltage controller, the filter voltage vector command device generating a filter voltage command vector that becomes a reference of the three-phase AC power output from the AC terminal, the three-phase AC output voltage at the AC terminal being input as an input signal to the voltage controller, the voltage controller including an integrator which integrates a difference between the filter voltage command vector from the filter voltage vector command device and the three-phase AC output voltage at the AC terminal and specifies an internal equivalent impedance of the three-phase voltage source. DC-AC power converting circuit, the target current producing means outputting a PWM command such that a DC component included in the three-phase AC output voltage at the AC terminal becomes zero; and
an M conversion circuit that converts the input signal input to the target current producing means into a signal on an $\alpha\beta$ coordinate space having an $\alpha$-axis and a $\beta$-axis, the $\alpha$-axis and the $\beta$-axis being orthogonal to each other based on one of three phases, the M conversion circuit inputting the signal on the $\alpha\beta$ coordinate space to the target current producing means.

2. The three-phase voltage source DC-AC power converter according to claim 1, further comprising an output current detecting circuit that detects the three-phase AC output current at the AC terminal to input the detected current value as an input signal to the target current producing means,
wherein the target current producing means includes:
a filter current compensator that adds a current compensation vector to the PWM command output from the voltage controller, the current compensation vector being defined so as to compensate a current loss in a three-phase AC filter circuit of the three-phase voltage source DC-AC power converting circuit;
a PWM current deviation compensator that adds a current deviation compensation vector to the PWM command output from the voltage controller, the current deviation compensation vector being defined so as to compensate a current deviation of three-phase AC output current from the three-phase voltage source DC-AC power converting circuit; and
a feedforward amplifier that amplifies the detected current value input from the output current detecting circuit with a predetermined gain, adds the detected current value to the PWM command output from the voltage controller, and compensates a fluctuation in three-phase AC output voltage caused by a change in three-phase AC output current at the AC terminal.

3. The three-phase voltage source DC-AC power converter according to claim 2, wherein the voltage controller includes an amplifier and the integrator, the amplifier and the integrator being connected in parallel, the difference between the filter voltage command vector from the filter voltage vector command device and the three-phase AC output voltage at the AC terminal being input to the amplifier and the integrator, and
a transfer function is expressed as $\alpha(1+1/(T_I S))$, where $\alpha$ is a gain of the amplifier and $T_I$ is an integration time constant of the integrator.

4. The three-phase voltage source DC-AC power converter according to claim 2,
wherein a transfer function of the integrator is expressed as $\alpha/(T_I S))$, where $T_I$ represents a time constant of the integrator which is determined by a resistance component Ri and an inductance component Li both of which constituting the internal equivalent impedance, and $\alpha$ represents a feedback gain.

5. The three-phase voltage source DC-AC power converter according to claim 1, wherein the voltage controller includes an amplifier and the integrator, the amplifier and the integrator being connected in parallel, the difference between the filter voltage command vector from the filter voltage vector command device and the three-phase AC output voltage at the AC terminal being input to the amplifier and the integrator, and
a transfer function is expressed as $\alpha(1+1/(T_I S))$, where $\alpha$ is a gain of the amplifier and $T_I$ is an integration time constant of the integrator.

6. The three-phase voltage source DC-AC power converter according to claim 1,
   wherein a transfer function of the integrator is expressed as $\alpha/(T_I \cdot S)$, where $T_I$ represents a time constant of the integrator which is determined by a resistance component and an inductance component Li both of which constituting the internal equivalent impedance, and $\alpha$ represents a feedback gain.

\* \* \* \* \*